US007126080B1

(12) United States Patent
Renault et al.

(10) Patent No.: US 7,126,080 B1
(45) Date of Patent: Oct. 24, 2006

(54) PLASMA GAS DISTRIBUTOR WITH INTEGRAL METERING AND FLOW PASSAGEWAYS

(75) Inventors: Thierry R. Renault, West Lebanon, NH (US); Nakhleh A. Hussary, West Lebanon, NH (US); Darrin H. MacKenzie, Windsor, VT (US); Christopher J. Conway, Wilmot, NH (US); Kevin D. Horner-Richardson, Cornish, NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 0 days.

(21) Appl. No.: 11/176,894

(22) Filed: Jul. 7, 2005

(51) Int. Cl.
*B23K 10/00* (2006.01)

(52) U.S. Cl. ............................ 219/121.48; 219/121.51

(58) Field of Classification Search ........... 219/121.39, 219/121.48, 121.5, 121.51, 121.52, 121.59, 219/74, 75
See application file for complete search history.

(56) References Cited

U.S. PATENT DOCUMENTS 3,366,772 A 1/1968 Wickham et al.
4,861,962 A * 8/1989 Sanders et al. .......... 219/121.5
4,902,871 A 2/1990 Sanders et al.
5,170,033 A 12/1992 Couch, Jr. et al.
5,726,415 A 3/1998 Luo et al.
5,747,767 A 5/1998 Severance et al.
5,856,647 A * 1/1999 Luo ........................ 219/121.5
5,893,985 A 4/1999 Luo et al.
6,191,380 B1 * 2/2001 Thomas ................ 219/121.48
6,268,583 B1 * 7/2001 Yamaguchi et al. ... 219/121.52

FOREIGN PATENT DOCUMENTS

JP 62-028084 2/1987
JP 62-240170 10/1987
JP 07-241681 9/1995

* cited by examiner

*Primary Examiner*—Mark Paschall
(74) *Attorney, Agent, or Firm*—Harness, Dickey & Pierce P.L.C.

(57) ABSTRACT

A gas distributor for use in a plasma arc torch is provided that has at least one plasma gas passageway formed conjointly with a metering passageway, and at least one helical gas passageway formed along an interior portion of the gas distributor, wherein the helical gas passageway is in fluid communication with the plasma gas passageway and the metering passageway. The combination of the metering passageway and the helical gas passageway provides for a metered flow rate and a controlled swirling flow of plasma gas within the plasma arc chamber, respectively, which functions to reduce the amount of molten emissive insert that is ejected from within an electrode at arc shut off, thereby resulting in an increased life of the consumable electrode.

22 Claims, 15 Drawing Sheets

PLASMA GAS DISTRIBUTOR WITH INTEGRAL METERING AND FLOW PASSAGEWAYS

FIELD OF THE INVENTION

The present invention relates generally to plasma arc torches and more particularly to devices and methods to improve the life of consumable components that operate within a plasma arc torch.

BACKGROUND OF THE INVENTION

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode. Further, the electrode is in a spaced relationship with the tip, thereby creating a gap, at the distal end of the torch. In operation, a pilot arc is created in the gap between the electrode and the tip, often referred to as the plasma arc chamber, which heats and subsequently ionizes the gas. The ionized gas is blown out of the torch and appears as a plasma stream that extends distally off the tip. As the distal end of the torch is moved to a position close to the workpiece, the arc jumps or transfers from the torch tip to the workpiece with the aid of a switching circuit activated by the power supply. Accordingly, the workpiece serves as the anode, and the plasma arc torch is operated in a "transferred arc" mode.

During operation of the plasma arc torch, both the electrode and the tip, among other components, are subjected to extremely high temperatures and severe conditions from the high current, gas flow, and the plasma stream, in addition to chemical reactions with different types of gases at high temperatures. These conditions are especially intense within the plasma arc chamber, and as a result, cause wear of the electrode and the tip over time. With increased wear, the performance of these components degrades, causing the plasma stream to become less controlled and constricted, which eventually effects cut quality of the plasma arc torch in a negative manner. Thus to maintain an acceptable cut quality, the components such as the electrode and the tip must be periodically replaced, hence the reference to these components as "consumable components."

In most electrodes for plasma arc torches, an emissive insert is disposed within a distal end of the electrode face. The emissive insert is typically a material such as Hafnium, and thus provides a location for arc attachment and transfer during operation due to its inherent ability to transfer electrons more efficiently than other materials. During operation however, the Hafnium wears according to several mechanisms depending on the stage of the cutting process. During plasma arc ignition, the primary wear mechanism is related to high ion flux pressures and electromagnetic pressures, as well as possible cracking and loss of an oxide layer on the surface, whereas during cutting, the primary wear mechanism is evaporation. At plasma arc shut off, a surge of gas within the plasma arc chamber has a tendency to displace the Hafnium, which becomes molten with the extremely high temperatures. Accordingly, the displacement of molten Hafnium increases wear of the electrode and decreases the usable life of the electrode. Additionally, Hafnium is a relatively expensive material and thus it is desirable to reduce wear and replacement of the electrodes as much as possible.

Therefore, a need exists in the art to provide improved techniques for extending the life of consumable components for use in plasma arc torches.

SUMMARY OF THE INVENTION

In one preferred form, the present invention provides a gas distributor for use in a plasma arc torch that comprises a body defining a proximal end portion and a distal end portion, at least one plasma gas passageway formed in the proximal end portion, a metering passageway formed conjointly with the plasma gas passageway, and at least one helical gas passageway formed along an interior portion of the body. The helical gas passageway is in fluid communication with the plasma gas passageway and the metering passageway, and the combination of the metering passageway and the helical gas passageway functions to reduce the amount of molten Hafnium that is ejected from an electrode when the arc shuts off, thus extending the life of the electrode.

In another form of the present invention, a plasma arc torch is provided that comprises an electrode, a tip, and a gas distributor disposed between the electrode and the tip. The gas distributor comprises a body defining a proximal end portion and a distal end portion, at least one plasma gas passageway formed in the proximal end portion, at least one metering passageway formed conjointly with the plasma gas passageway, and at least one helical gas passageway formed along an interior portion of the body. The helical gas passageway is in fluid communication with the plasma gas passageway and the metering passageway, and the combination of the metering passageway and the helical gas passageway functions to reduce the amount of molten Hafnium that is ejected from an electrode when the arc shuts off, thus extending the life of the electrode.

In yet another form of the present invention, a plasma arc torch is provided that comprises an electrode, a tip, and a gas distributor disposed between the electrode and the tip to define a plasma arc chamber therebetween. The gas distributor comprises a helical gas passageway formed along an interior portion of the body. The plasma arc torch further comprises a plasma gas passageway disposed proximally from the plasma arc chamber to provide a supply of plasma gas to the plasma arc chamber, and a flow metering device disposed within the plasma gas passageway and in fluid communication with the helical gas passageway. In one form, the flow metering device is a plug disposed within the plasma gas passageway that defines a metering passageway smaller in size than the plasma gas passageway.

Still another form of the present invention comprises a gas distributor comprising at least one helical gas passageway formed along an interior portion of the body, the helical gas passageway defining at least one groove. Additional forms of the gas distributor comprise a multi-pitch helical passageway formed in the gas distributor that includes longer and shorter pitches along the length of the gas distributor.

A method of operating a plasma arc torch is provided according to the present invention that comprises the steps of directing a flow of plasma gas through at least one plasma gas passageway, successively directing the flow of plasma gas through at least one metering passageway such that a flow of the plasma forming gas is metered, and successively directing the metered flow rate plasma forming gas through a helical gas passageway within a gas distributor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION OF THE PREFERRED EMBODIMENTS

The following description of the preferred embodiments is merely exemplary in nature and is in no way intended to limit the invention, its application, or uses.

Figure 1:
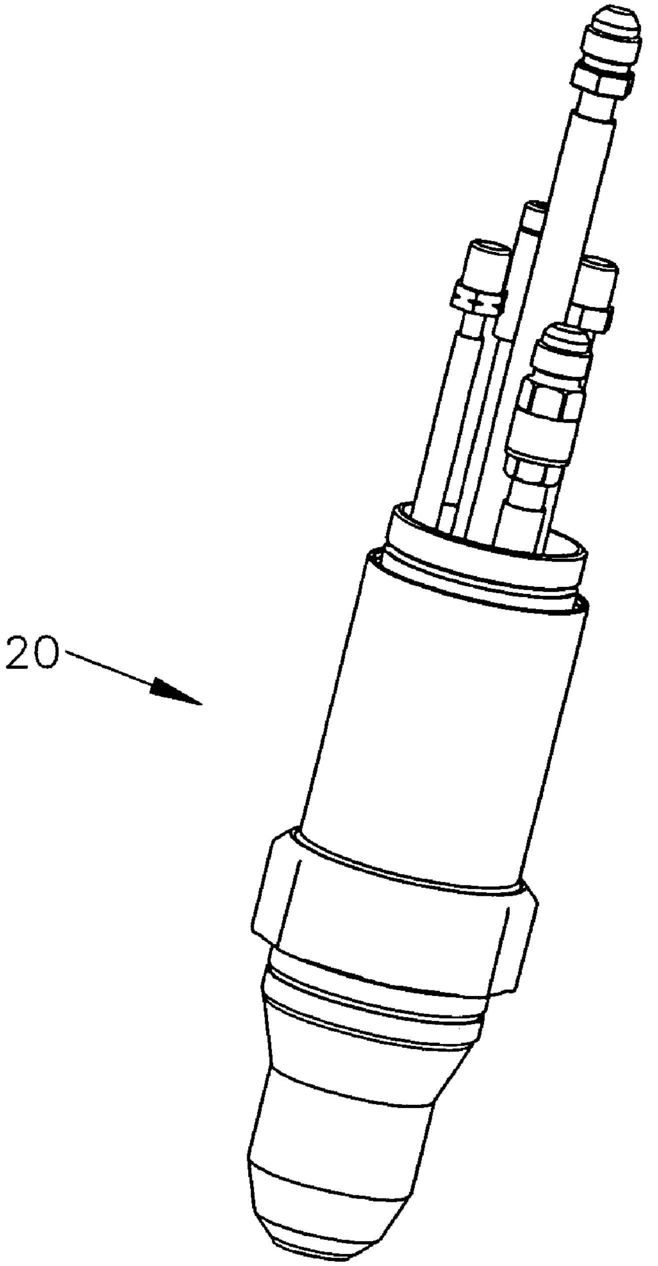
FIG. 1 is a perspective view of a plasma arc torch in accordance with the principles of the present invention.
Figure 2:
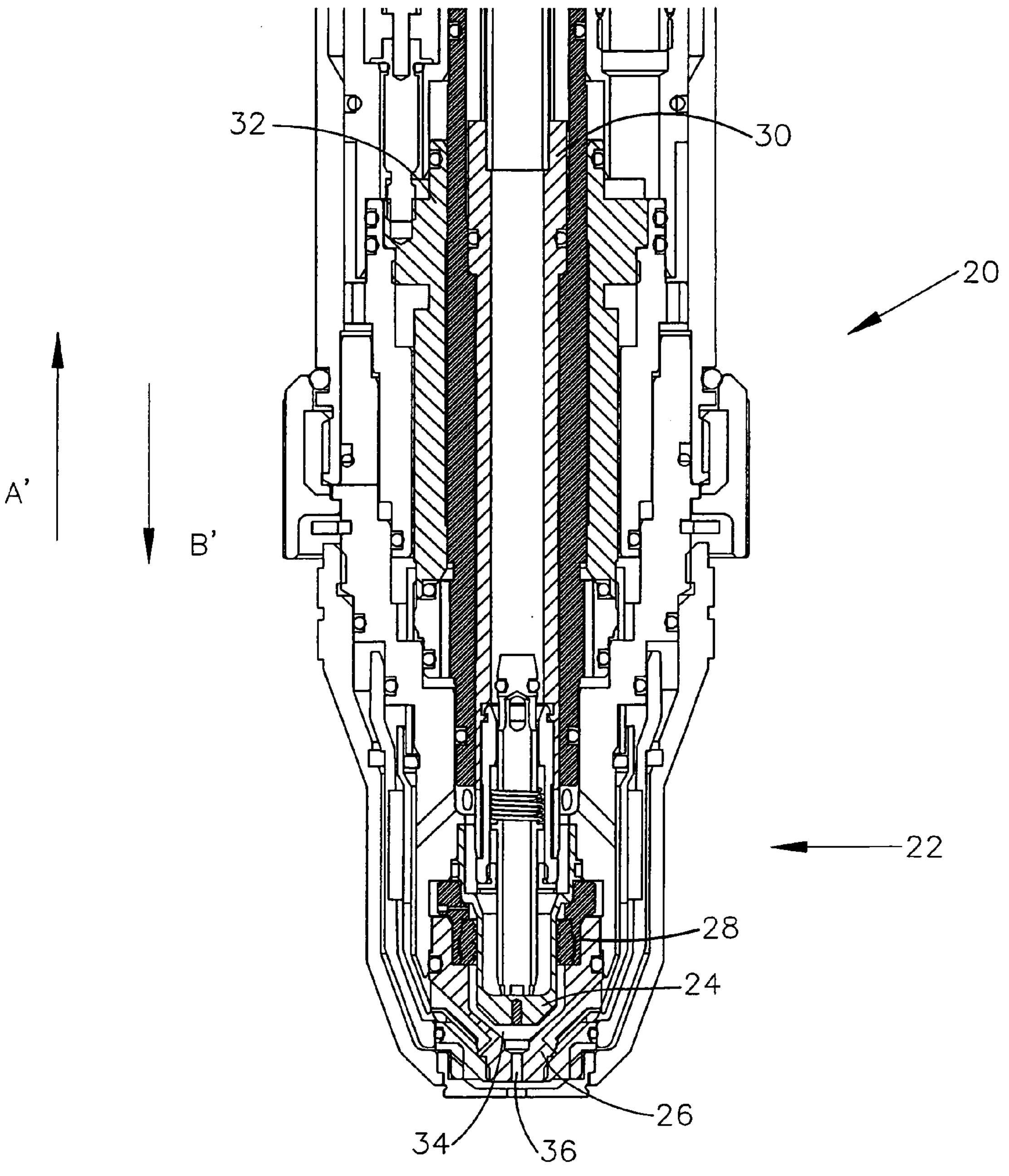
FIG. 2 is a cross-sectional view of the plasma arc torch of FIG. 1 in accordance with the principles of the present invention.

Referring to FIGS. 1 and 2, a plasma arc torch according to the principles of the present invention is illustrated and generally indicated by reference numeral 20. Although the plasma arc torch 20 as shown is an automated torch, the teachings of the present invention may also applicable to a manual plasma arc torch, with either a contact start such as that shown and described in U.S. Pat. No. 6,903,301 titled "Contact Start Plasma Arc Torch and Method of Initiating a Pilot Arc," or a high frequency start torch such as that shown and described in U.S. Pat. No. 6,163,008 titled "Plasma Arc Torch," both of which are commonly owned with the present application and the contents of which are incorporated by reference herein in their entirety.

As used herein, a plasma arc torch, whether operated manually or automated, should be construed by those skilled in the art to be an apparatus that generates or uses plasma for cutting, welding, spraying, gouging, or marking operations, among others. Accordingly, the specific reference to plasma arc cutting torches, plasma arc torches, or manually operated plasma arc torches herein should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention. Additionally, as used herein, the words "proximal direction" or "proximally" is the direction as depicted by arrow A', and the words "distal direction" or "distally" is the direction as depicted by arrow B'.

Referring to FIG. 2, the plasma arc torch 20 comprises a set of consumable components at a distal end 22 of the torch. The consumable components include an electrode 24, a tip 26, and a gas distributor 28 disposed between the electrode 24 and the tip 26. The electrode 24 is in electrical contact with a cathode 30 and forms the negative, or cathodic side of the power supply. The tip 26 is in electrical contact with an anode body 32 and forms the positive, or anodic side of the power supply. As further shown, a plasma arc chamber 34 is formed between the electrode 24 and the tip 26. When electric power is applied to the plasma arc torch 20, a pilot arc is generated in the plasma arc chamber 34. As the plasma forming gas enters the plasma arc chamber 34, the plasma forming gas is ionized by the pilot arc, which causes a plasma stream to form within the plasma arc chamber 34 and flow distally through a central exit orifice 36 of the tip 26. Further operation of the exemplary plasma arc torch 20 illustrated herein is described in pending application Ser. No. 10/409,650 titled "Plasma Arc Torch," which is commonly assigned with the present application and the contents of which are incorporated herein by reference in their entirety.

Figure 3:
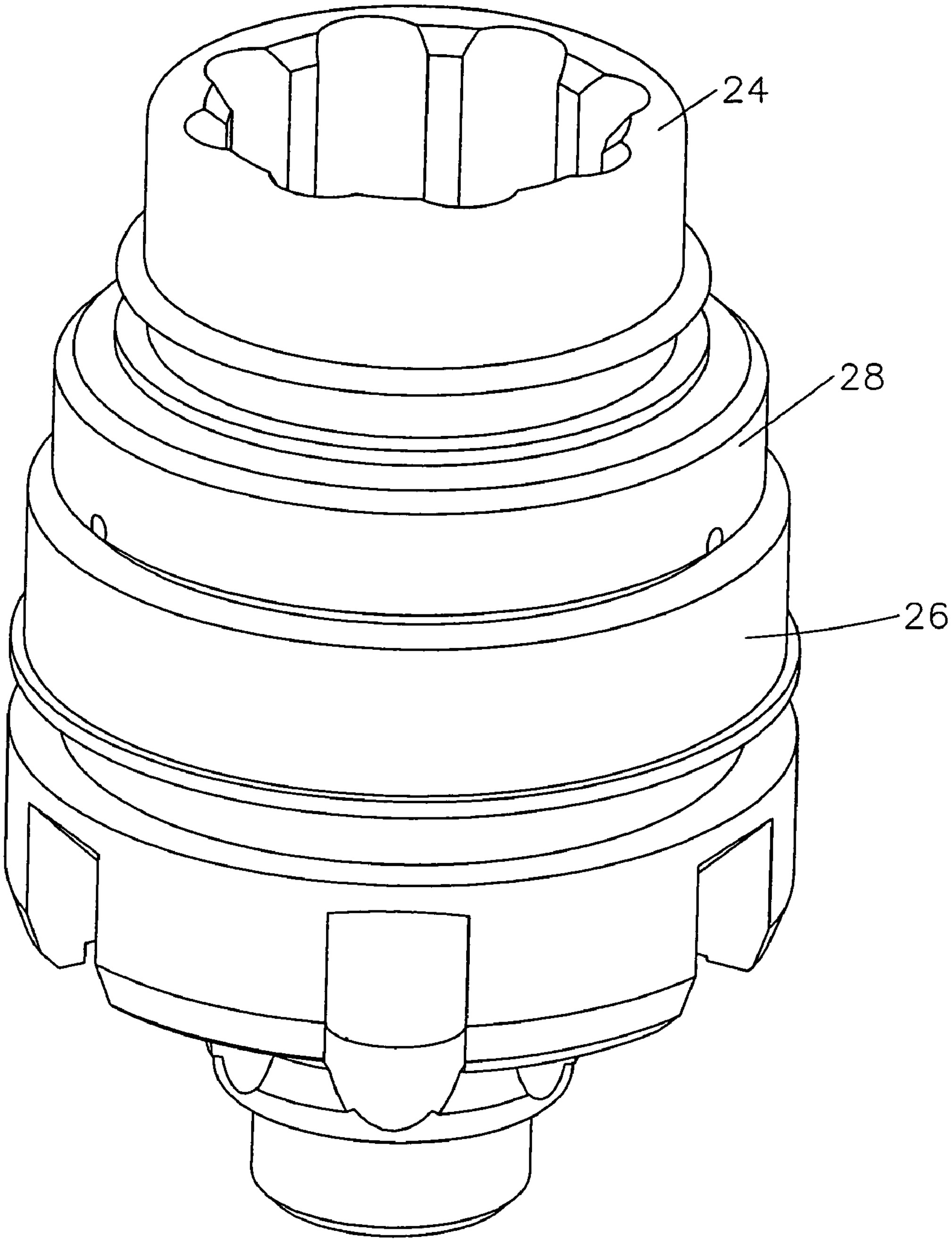
FIG. 3 is a perspective view of an electrode, gas distributor, and tip assembly constructed in accordance with the principles of the present invention.
Figure 4:
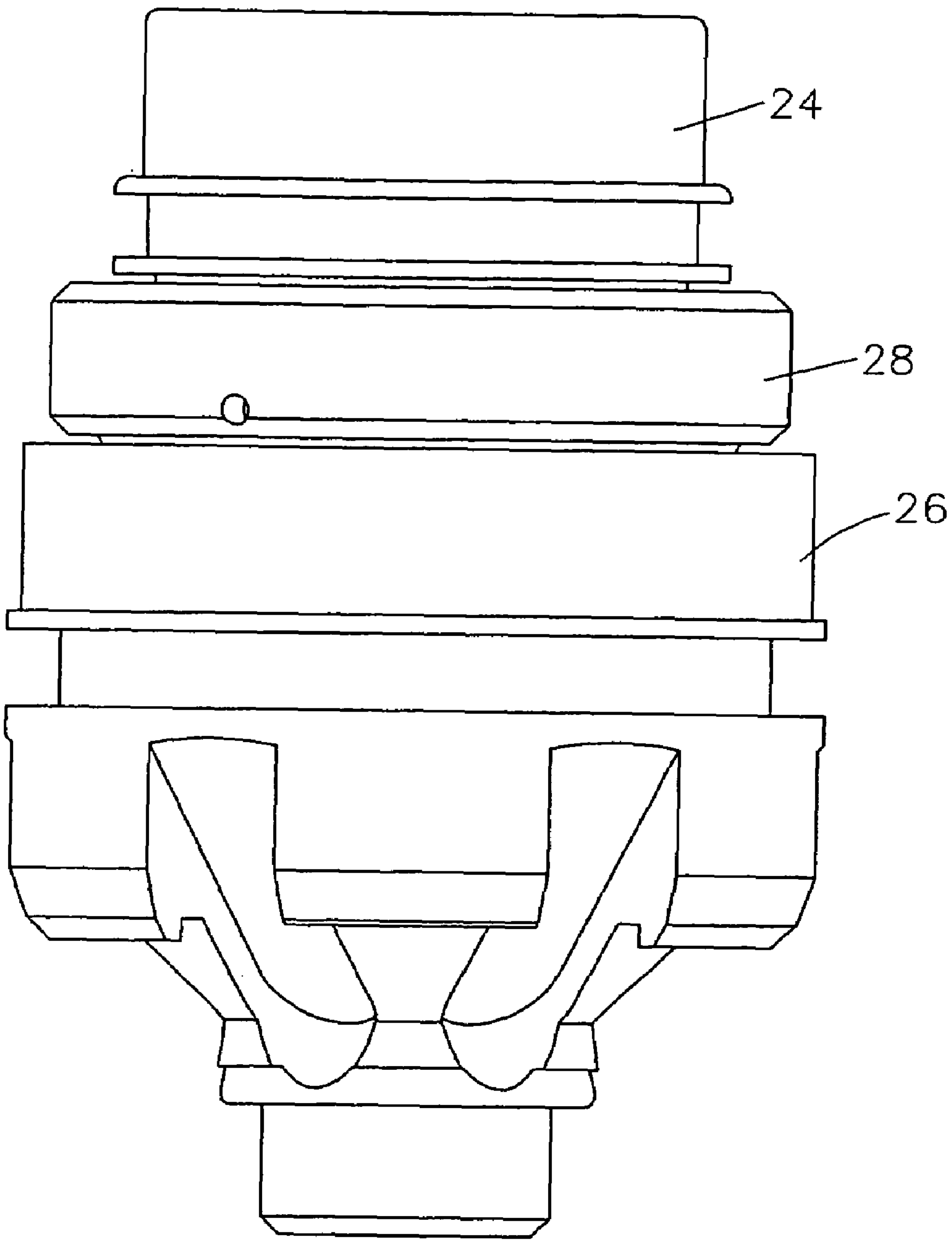
FIG. 4 is a side view of the electrode, gas distributor, and tip assembly of FIG. 3 in accordance with the principles of the present invention.
Figure 5:
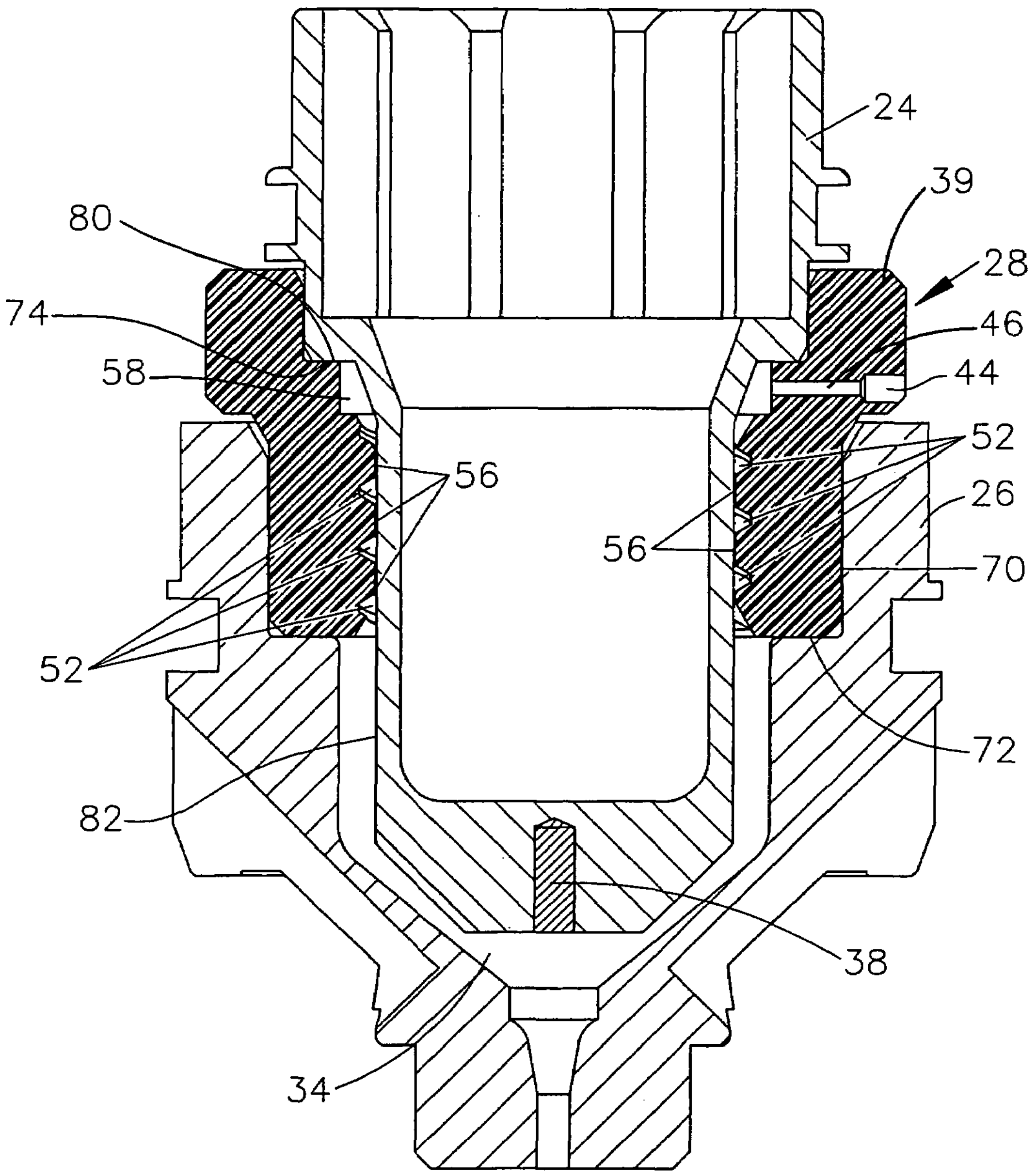
FIG. 5 is a cross-sectional view, taken through the plane of FIG. 4, of the electrode, gas distributor, and tip assembly in accordance with the principles of the present invention.

Referring now to FIGS. 3 through 5, an assembly of the electrode 24, the tip 26, and the gas distributor 28 is illustrated in greater detail. As shown, the gas distributor 28 is disposed between the electrode 24 and the tip 26 to provide electrical isolation between the cathodic (electrode 24) and the anodic (tip 26) sides of the power supply. The gas distributor 28 also distributes the plasma forming gas into the plasma arc chamber 34 for generation of the plasma stream as previously described. As further shown, an emissive insert 38 is disposed within a distal end of the electrode 24, which is preferably Hafnium in one form of the present invention.

Figure 6:
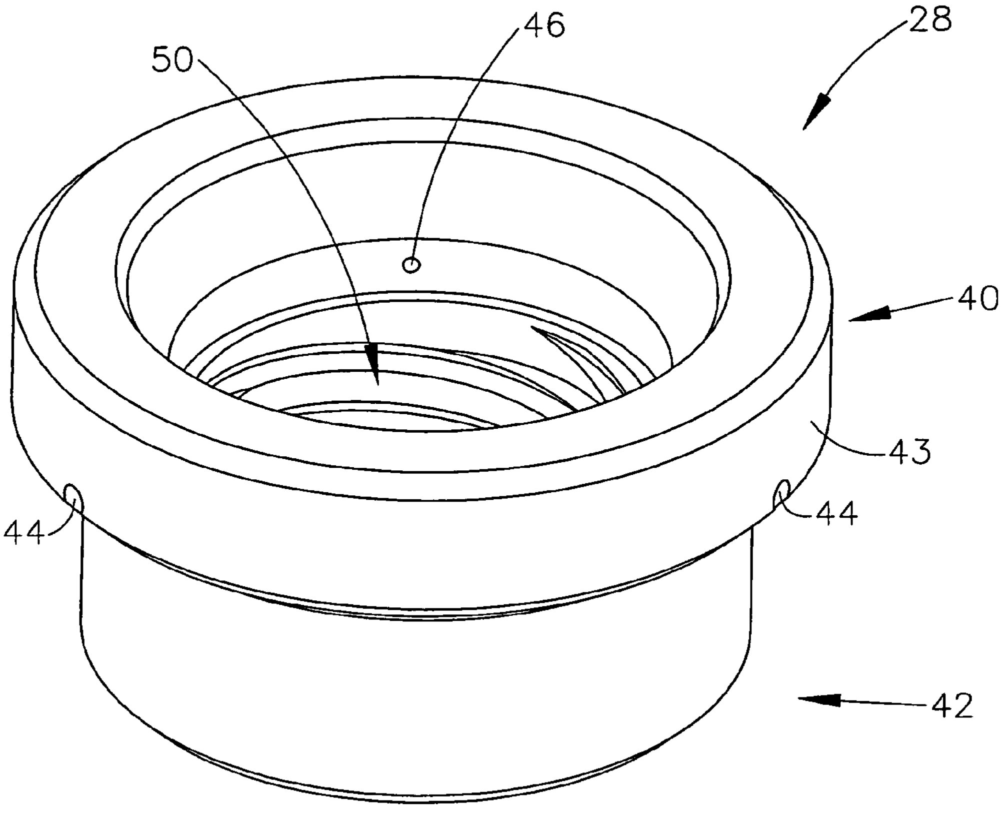
FIG. 6 is a perspective view of the gas distributor constructed in accordance with the principles of the present invention.
Figure 7:
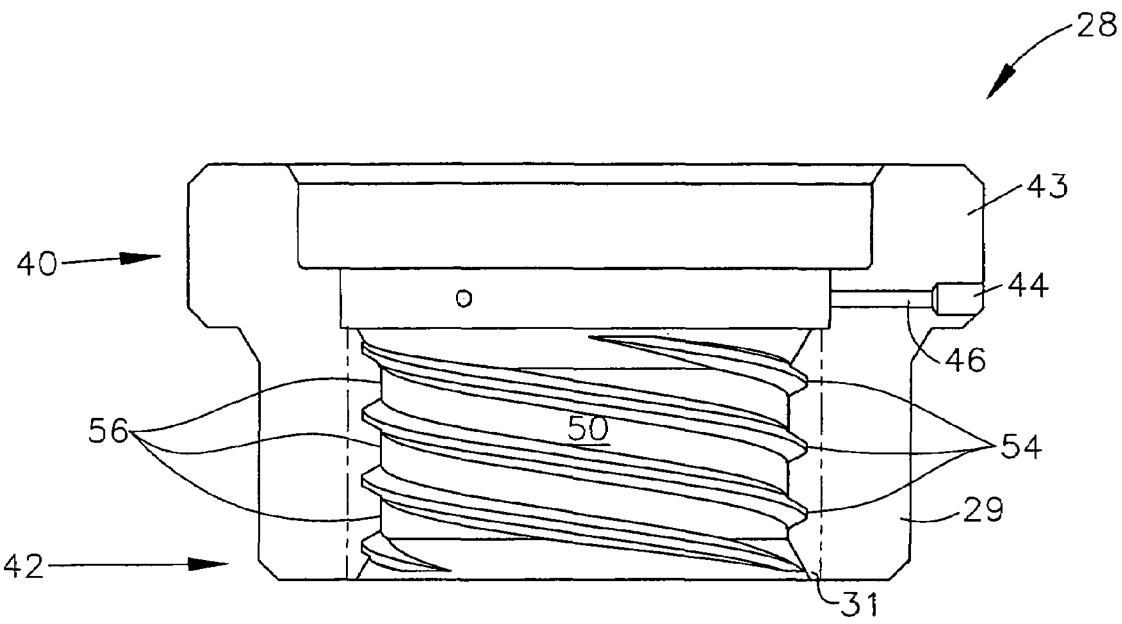
FIG. 7 is a side cross-sectional view of the gas distributor of FIG. 6 in accordance with the principles of the present invention.

With further reference to FIGS. 5 through 7, the gas distributor 28 according to the teachings of the present invention comprises a body 39 having a proximal end portion 40 and a distal end portion 42. The proximal end portion 40 defines an annular wall 43 through which a plurality of plasma gas passageways 44 and metering passageways 46 are formed. With specific reference to FIGS. 5 and 7, the plasma gas passageways 44 are formed conjointly with the metering passageways 46, wherein the plasma gas passageways 44 and the metering passageways 46 form a common passageway for the distribution of the plasma forming gas into the plasma arc chamber 34. The plasma gas passageways 44 and the metering passageways 46 are preferably formed normal to the annular wall 43 as shown, however, these passageways may be formed at an angle while still remaining within the scope of the present invention. Additionally, although three (3) sets, (a set being defined as one plasma gas passageway 44 and one metering passageway 46), of plasma gas passageways 44 and metering passageways 46 are illustrated herein, it should be understood that a single set or any number of sets may be employed while not departing from the spirit and scope of the present invention. Moreover, it should be understood that there need not be a unique metering passageway 46 for every plasma gas passageway 44, and vice versa, i.e. the metering passageways 46 and plasma gas passageways 44 need not necessarily be formed conjointly.

As further shown, the gas distributor 28 defines an interior portion 50, wherein a plurality of helical gas passageways 52 are formed between the electrode 24 and the gas distributor 28. The helical gas passageways 52 are defined in part by helical grooves 54 separated by helical ridges 56 of the gas distributor 28 as shown, wherein the helical grooves 54 are preferably formed integral with and into the interior portion 50 of the gas distributor 28. When the electrode 24 is disposed within the gas distributor 28, the helical gas passageways 52 are in fluid communication with the plasma gas passageways 44 and the metering passageways 46. More specifically, the plasma forming gas flows into the plasma gas passageways 44, through the metering passageways 46, into an annular chamber 58 formed between the electrode 24 and the gas distributor 28, through the helical gas passageways 52, and into the plasma arc chamber 34.

The provisions of the metering passageways 46 in combination with the helical gas passageways 52 result in a metering of the plasma forming gas flow and establishing a fully developed swirling flow within the plasma arc chamber 34, respectively, which extends the life of the electrode 24 by maintaining the molten surface of the emissive insert 38 in place within the electrode 24 while the plasma arc shuts off. Generally, the metering passageways 46 limit the flow rate of plasma forming gas into the plasma arc chamber 34 when the pressure in the plasma arc chamber 34 decreases. With the limiting of the flow rate by the metering passageways 46, the plasma forming gas is not imparted with a well established swirling motion, and thus the helical gas passageways 52 direct the flow of plasma forming gas in a swirling pattern between the gas distributor 28 and the electrode 24 to establish a fully developed swirling flow. With the presence of the helical gas passageways 52 and the resulting swirling plasma gas flow, the plasma gas can be metered without a significant pressure drop from the metering passageways 46 to the central exit orifice 36 of the tip 26, i.e. through the plasma chamber, while the plasma arc is on. Additionally, swirling the flow aids in constricting the plasma arc to generate an improved cut quality.

Accordingly, the teachings of the present invention provide a method of improving the life of consumable parts in a plasma arc torch by limiting the flow rate of the plasma forming gas into the plasma arc chamber 34 combined with swirling the plasma forming gas such that a significant pressure drop does not occur when cutting, and such that the amount of molten emissive insert 38 that is ejected from within the electrode 24 is reduced when the plasma arc shuts off.

In another form of the present invention, the size and number of plasma gas passageways 44, the corresponding size and number of metering passageways 46, and/or the size and number of helical gas passageways 52 are varied as a function of the operating current of the plasma arc torch 20. For example, the three (3) sets of passageways as illustrated herein are used for 100A, while fewer may be employed for lower amperages and more for higher amperages.

Figure 8:
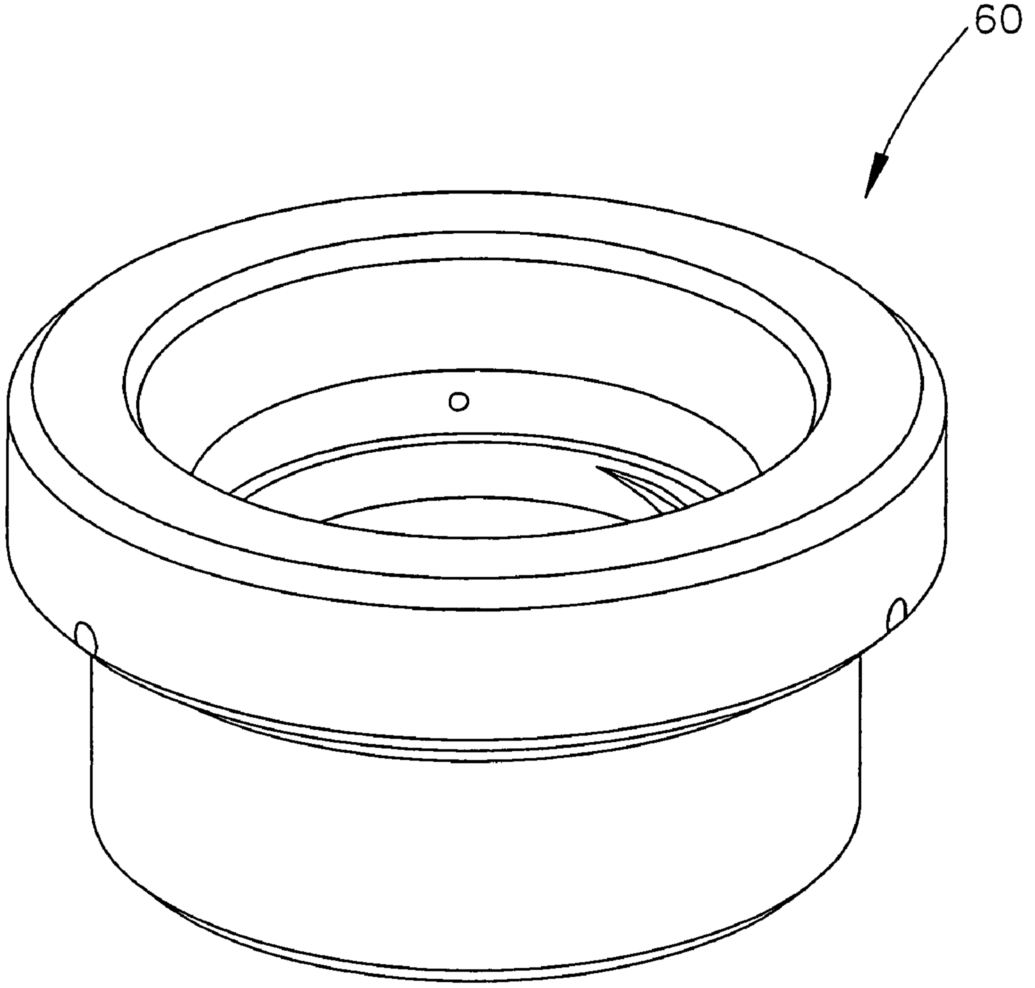
FIG. 8 is a perspective view of a second embodiment of a gas distributor having a single helical gas passageway and constructed in accordance with the principles of the present invention.
Figure 9:
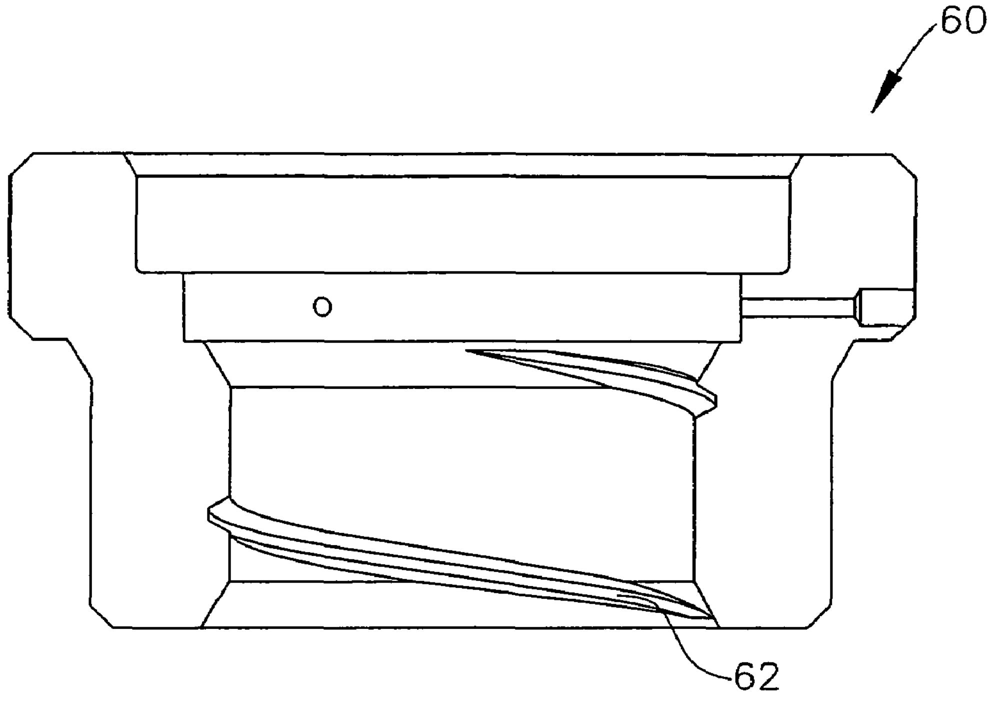
FIG. 9 is a side cross-sectional view of the gas distributor of FIG. 8 in accordance with the principles of the present invention.

As shown in FIGS. 8 and 9, a second embodiment of a gas distributor according to the principles of the present invention is illustrated and generally indicated by reference numeral 60. The gas distributor 60 comprises similar features and functions as does the first embodiment of the gas distributor 28 as previously illustrated and described, except that the gas distributor 60 comprises a single helical groove 62 rather than the multiple helical grooves 54. Accordingly, the size and number of helical gas passageways may be varied according to specific application requirements while remaining within the scope of the present invention.

Additionally, the gas distributors 28 and 60 provide for improved alignment between the electrode 24 and the tip 26. As shown in FIG. 5, the gas distributor 28 comprises a distal exterior wall 70 and a distal face 72, which abut the tip 26 to provide horizontal and vertical positioning of the gas distributor 28 relative to the tip 26. As further shown, the gas distributor 28 comprises an annular internal shoulder 74, onto which an external shoulder 80 of the electrode 24 is disposed as shown to provide vertical positioning of the electrode 24 relative to the tip 26. Additionally, the helical ridges 56 abut an external wall 82 of the electrode 24. Advantageously, the helical ridges 56 provide a relatively large mating surface with the electrode 24, and as such, alignment between the electrode 24 and the tip 26 is improved, which ultimately improves cut performance and tip life.

The material for the gas distributor 28 is electrically insulating is preferably a material such as Vespel®, however, alternative thermoplastics and other materials that provide the requisite insulation and dielectric standoff may also be employed while remaining within the scope of the present invention. Additionally, combinations of different materials may also be employed, such as various ceramics, including but not limited to, boron nitride and alumina, along with the thermoplastics, lava, and various fluoropolymers, among others. For example, in one form of the present invention as shown in FIG. 7, the gas distributor 28 comprises a Vespel® body 29 and a boron nitride insert 31, wherein the interface between the Vespel® body 29 and the boron nitride insert 31 is designated by the phantom line as shown. Preferably, the boron nitride insert 31 is machined and is pressed into the Vespel® body 29 with an interference fit.

Figure 10:
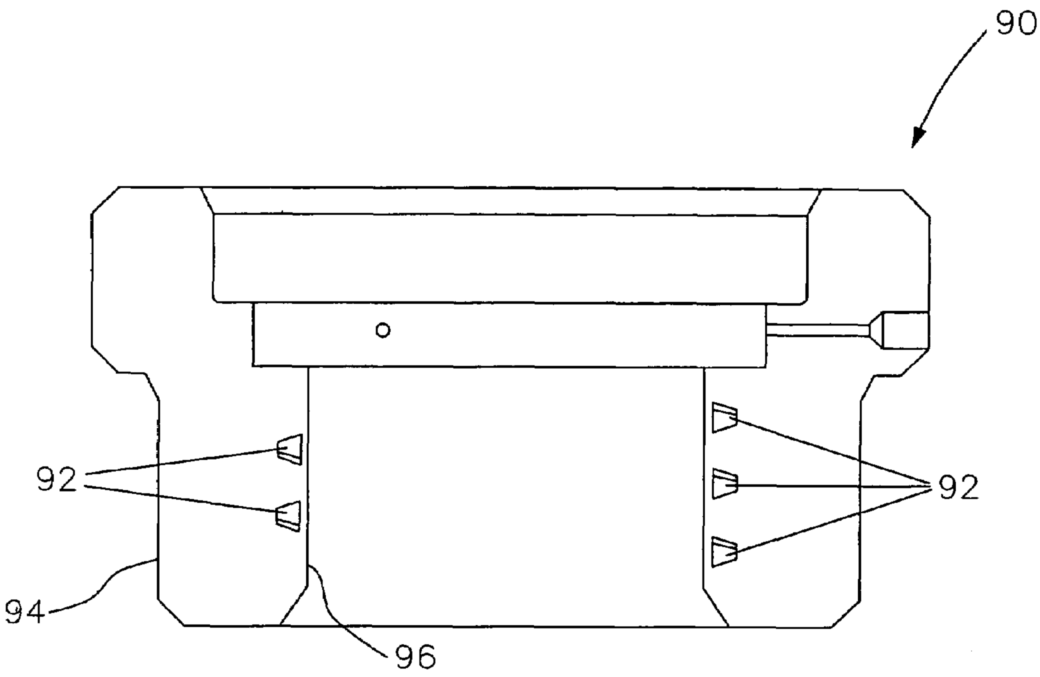
FIG. 10 is a cross-sectional view of another embodiment of a gas distributor having internal helical gas passageways and constructed in accordance with the principles of the present invention.

Referring to FIG. 10, yet another form of a gas distributor according to the teachings of the present invention is illustrated and generally indicated by reference numeral 90. In this embodiment, a helical gas passageway 92 is formed between an outer wall 94 and an inner wall 96 of the gas distributor 90, rather than being formed into the inner wall as previously described. Additionally, a gas distributor that is more than one piece (not shown) that provides a helical passageway for establishing a fully developed swirl of the plasma forming gas flow, may also be provided while remaining within the scope of the present invention.

Figure 11:
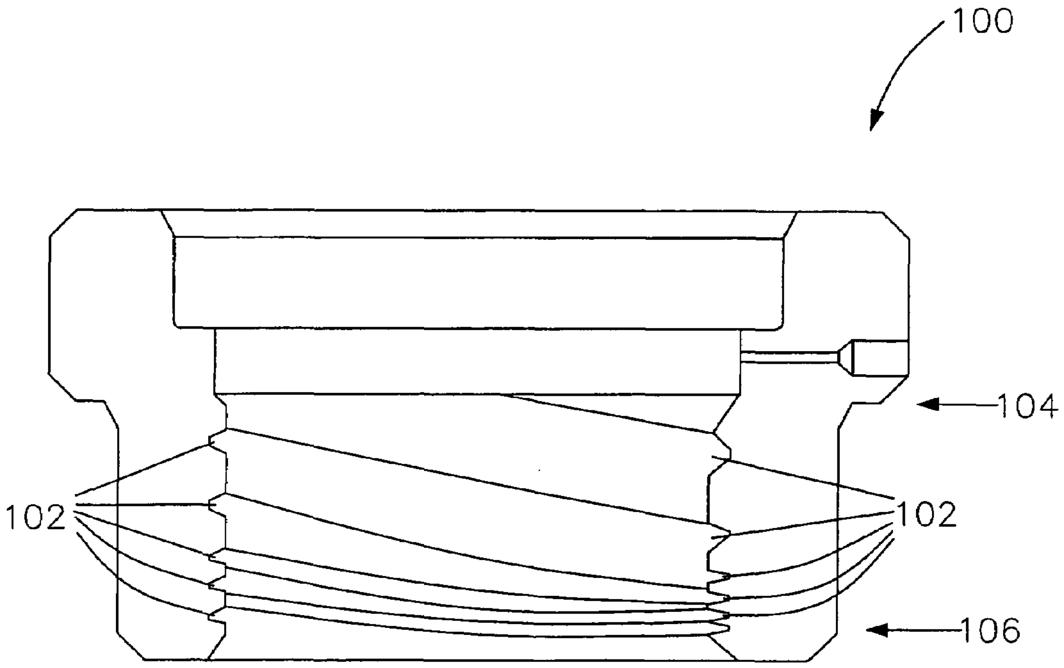
FIG. 11 is a cross-sectional view of another embodiment of a gas distributor having multiple-pitch helical gas passageways and constructed in accordance with the principles of the present invention.

Still another form of a gas distributor according to the teachings of the present invention is illustrated in FIG. 11 and generally indicated by reference numeral 100. The gas distributor 100 comprises a multi-pitch helical gas passageway 102 as shown, wherein the pitch is relatively longer towards a proximal end portion 104 and relatively shorter towards a distal end portion 106. With the multi-pitch helical gas passageway 102, the plasma forming gas flow can be further tailored for an optimum swirl based on, for example, the type of gas and the current level. It should be understood that the illustration in FIG. 11 is merely exemplary and thus any number of pitches and configurations, e.g. longer, shorter, and in any order and combination along the length of the gas distributor 100, may be employed while remaining within the scope of the present invention.

Figure 12:
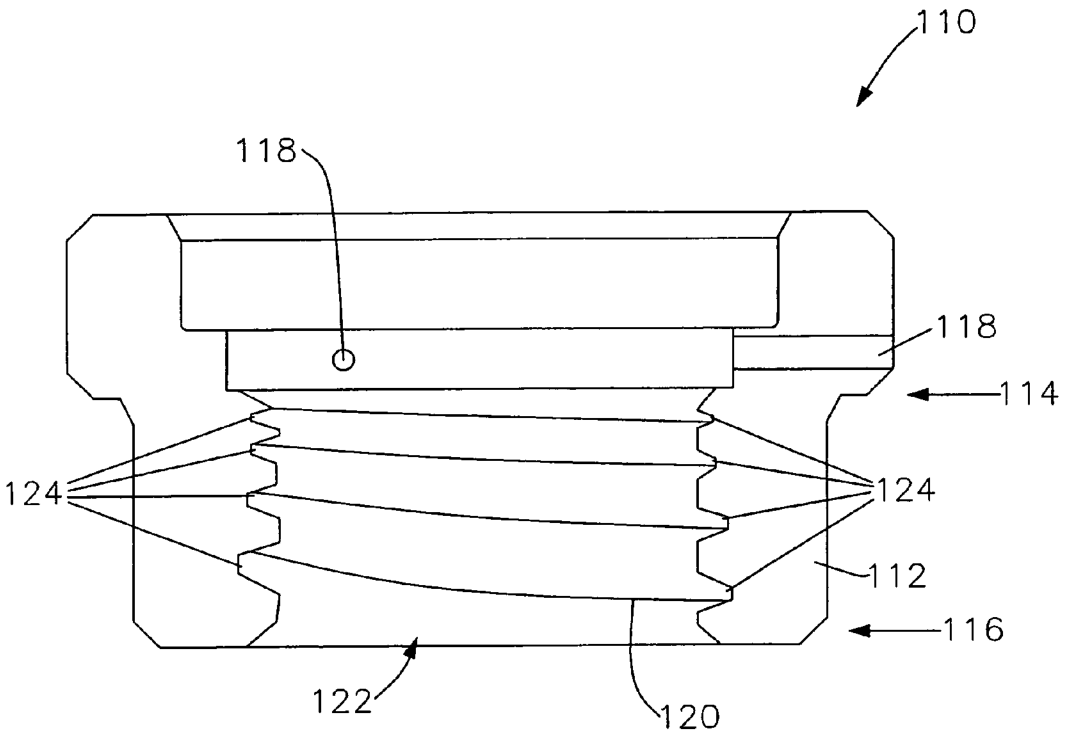
FIG. 12 is a cross-sectional view of yet another embodiment of a gas distributor having dual purpose helical gas passageways and constructed in accordance with the principles of the present invention.
Figure 14:
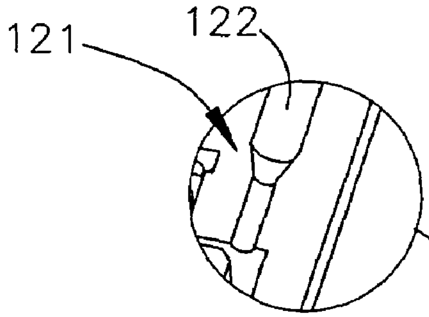
FIG. 14 is an exploded perspective cutaway view of the flow metering device of FIG. 13 in accordance with the principles of the present invention.

Referring to FIG. 12, yet another form of a gas distributor according to the teachings of the present invention is illustrated and generally indicated by reference numeral 110. The gas distributor 110 comprises a body 112 having a proximal end portion 114 and a distal end portion 116. A plasma gas passageway 118 is formed through the proximal end portion 114 and is in fluid communication with a helical gas passageway 120 formed along an interior portion 122 of the gas distributor 110. As further shown, the helical gas passageway 120 defines grooves 124 that are sized such that the grooves 124 towards the proximal end portion 114 are smaller in size and the grooves 124 towards the distal end portion 116 are larger in size. Accordingly, the smaller grooves 124 towards the proximal end portion 114 function to meter the plasma forming gas, similar to the metering passageways 46 as previously described, and thus such metering passageways 46 are not required in this embodiment. Additionally, the larger grooves 124 towards the distal end portion 116 function to fully develop a swirling flow of the plasma forming gas, similar to the helical gas passageways as previously described.

It should be understood that combinations of the above-described gas distributors may be employed while remaining within the scope of the present invention. For example, the multi-pitch helical gas passageway 102 of FIG. 11 can be combined with the different sizes of grooves 124 of FIG. 12 while not departing from the spirit and scope of the present invention. Such variations and combinations are to be construed as being within the teachings of the present invention.

Referring now to FIGS. 13 through 16, another form of the present invention is illustrated, wherein an alternate form of metering the plasma forming gas flow is provided. As shown, a flow metering device 121 is disposed within a plasma gas passageway 122 and functions as the previously described metering passageways 46 to limit the flow rate of the plasma forming gas. In combination with the helical gas passageways 52 of the gas distributor 28, or other helical passageway embodiments as described herein, metering of the plasma forming gas flow occurs in combination with establishing a fully developed swirl of the plasma forming gas flow, which extends the life of the electrode 24 by reducing the amount of molten emissive insert 38 that is ejected from the electrode 24 during arc shut off. Accordingly, metering of the plasma forming gas flow may be accomplished through alternate devices, and when combined with swirling of the plasma forming gas by the gas distributor 28, provides an improved technique for extending the life of consumable components.

Figure 16:
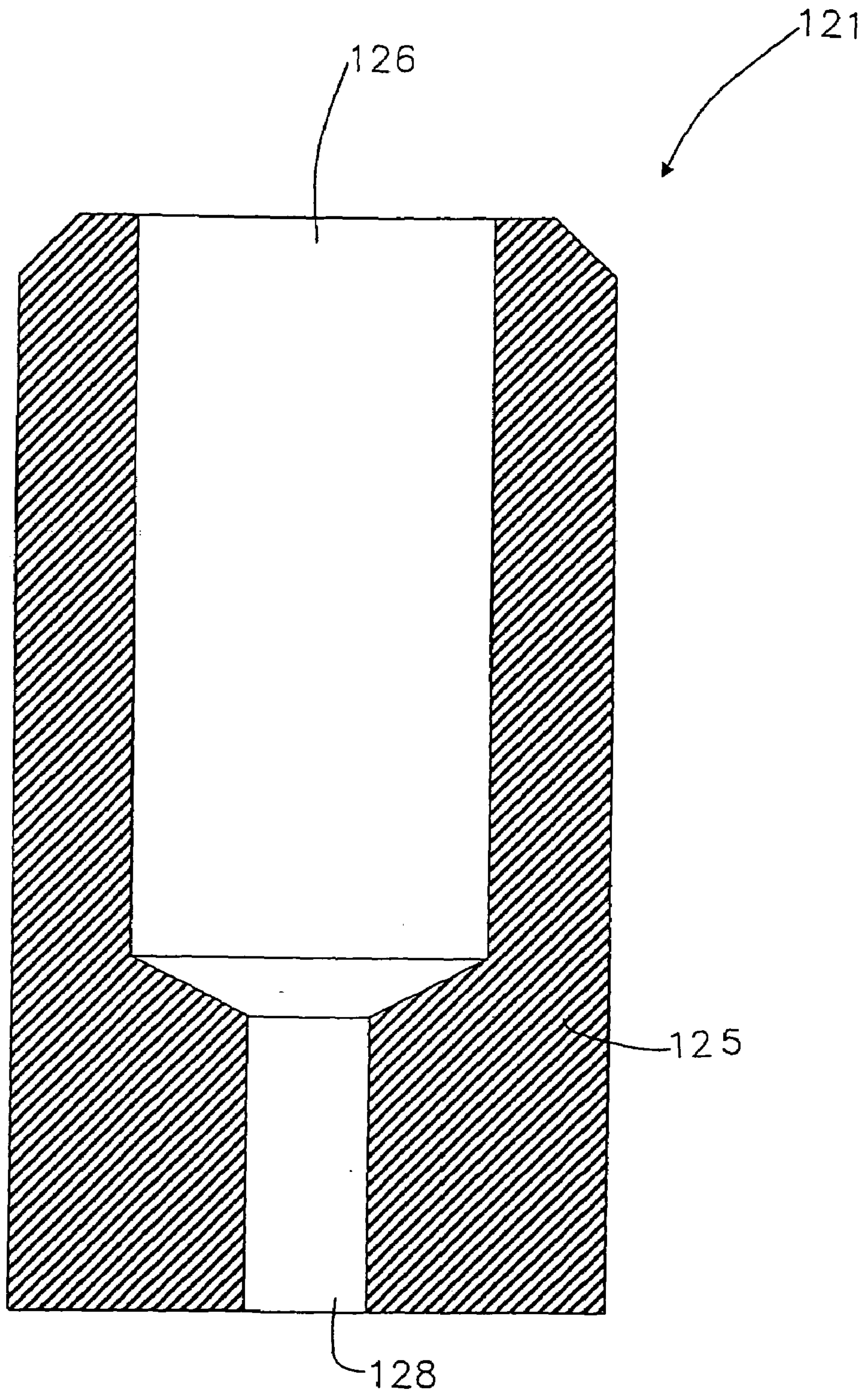
FIG. 16 is a cross-sectional view, taken along section A—A of FIG. 15, of the plug in accordance with the principles of the present invention.

In one preferred form, the flow metering device 121 is a plug 125 that defines a plasma gas passageway 126 and a metering passageway 128 as shown in FIG. 16. The plug 125 is inserted into a component (a cartridge body 130 as illustrated herein) of the plasma arc torch 20 as shown and is preferably a molded plastic material such as Vespel®. Since the adjacent component in this illustrative embodiment is an electrically insulative material, the plug 125 is also electrically insulative. However, other materials may be employed depending on the component that the plug 125 is inserted into while remaining within the scope of the present invention.

Figure 13:
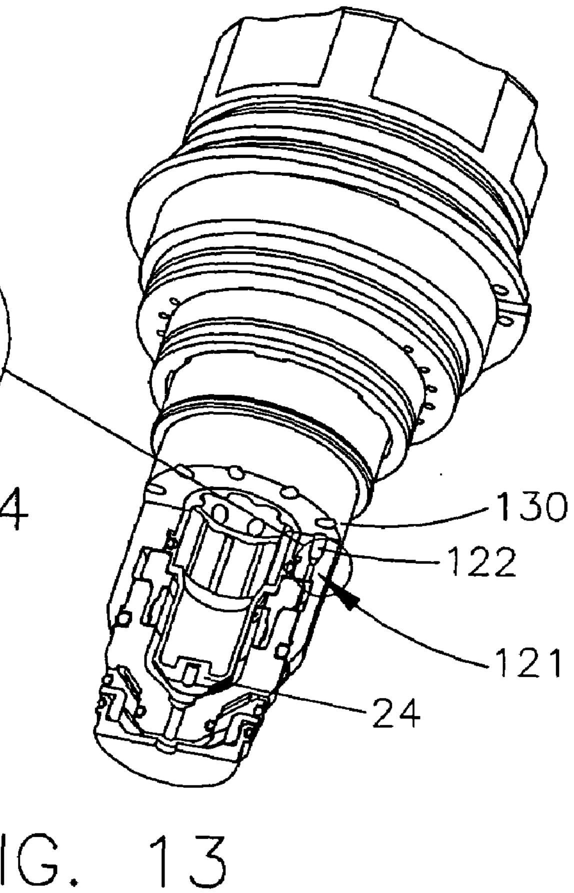
FIG. 13 is a perspective partial cutaway view of a second embodiment of a plasma arc torch having a flow metering device and constructed in accordance with the principles of the present invention.
Figure 15:
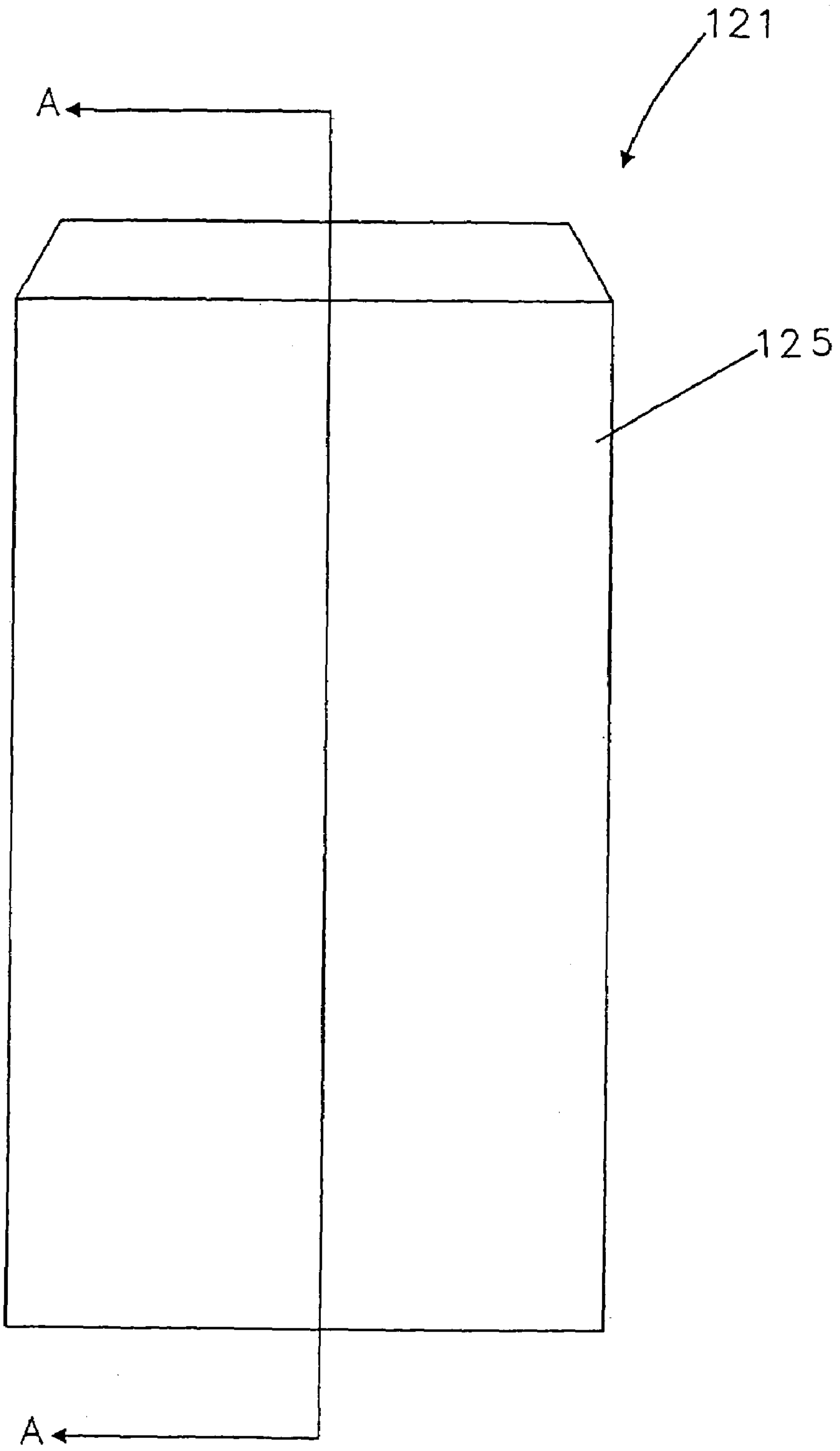
FIG. 15 is a side view of a plug used in conjunction with the plasma arc torch of FIG. 13 and constructed in accordance with the principles of the present invention.

Although not shown in FIG. 13, a plurality of plugs 125 are preferably disposed throughout a corresponding plurality of plasma gas passageways 122. However, any number of plugs 125, including only one (1) plug 125, may be employed according to specific flow requirements while remaining within the scope of the present invention.

The description of the invention is merely exemplary in nature and, thus, variations that do not depart from the substance of the invention are intended to be within the scope of the invention. For example, although the gas distributor 28 as shown and described herein is a single piece, a multiple piece gas distributor that provides both metering and swirling functions may also be provided while remaining within the scope of the present invention. Such variations are not to be regarded as a departure from the spirit and scope of the invention.

What is claimed is:

1. A gas distributor for use in a plasma arc torch comprising:

a body defining a proximal end portion and a distal end portion;

at least one plasma gas passageway formed in the proximal end portion;

at least one metering passageway formed conjointly with the plasma gas passageway; and at least one helical gas passageway formed along an interior portion of the body, the helical gas passageway being in fluid communication with the plasma gas passageway and the metering passageway.

2. The gas distributor according to claim 1, wherein the body further comprises an annular wall disposed around the proximal end portion, and the plasma gas passageway and the metering passageway are formed through the annular wall.

3. The gas distributor according to claim 2, wherein the plasma gas passageway and the metering passageway are positioned normal to the annular wall.

4. The gas distributor according to claim 1 further comprising a plurality of plasma gas passageways and a plurality of metering passageways.

5. The gas distributor according to claim 1, wherein the helical gas passageway defines at least one helical groove separated by a helical ridge, wherein the helical ridge provides an increased surface area to mate with an electrode to improve alignment between the electrode and a tip of the plasma arc torch.

6. The gas distributor according to claim 1, wherein the body comprises an electrically insulating material selected from the group consisting of thermoplastics, ceramics, lava, and fluoropolymers.

7. The gas distributor according to claim 1, wherein the gas distributor further comprises an insert disposed within the distal end portion of the body.

8. The gas distributor according to claim 7, wherein the body comprises a Vespel® material and the insert comprises a boron nitride material.

9. The gas distributor according to claim 1 further comprising a plurality of helical gas passageways.

10. The gas distributor according to claim 7 comprising three helical gas passageways.

11. The gas distributor according to claim 1, wherein a number and size of at least one of the plasma gas passageway, the metering passageway, and the helical gas passageway are varied as a function of current level.

12. The gas distributor according to claim 1, wherein the helical gas passageway is internal to the gas distributor and is formed between an outer wall and an inner wall of the gas distributor.

13. The gas distributor according to claim 1, wherein the helical gas passageway defines a multiple pitch.

14. A plasma arc torch comprising:

an electrode;

a tip; and a gas distributor disposed between the electrode and the tip, the gas distributor comprising:

a body defining a proximal end portion and a distal end portion;

at least one plasma gas passageway formed in the proximal end portion;

at least one metering passageway formed conjointly with the plasma gas passageway; and at least one helical gas passageway formed along an interior portion of the body, the helical gas passageway being in fluid communication with the plasma gas passageway and the metering passageway.

15. A plasma arc torch comprising:

an electrode;

a tip;

a gas distributor disposed between the electrode and the tip to define a plasma arc chamber therebetween, the gas distributor comprising a helical gas passageway formed along an interior portion of the body;

a plasma gas passageway disposed proximally from the plasma arc chamber to provide a supply of plasma gas to the plasma arc chamber; and a flow metering device disposed within the plasma gas passageway and in fluid communication with the helical gas passageway.

16. The plasma arc torch according to claim 15, wherein the helical gas passageway is formed between at least one helical groove formed in the gas distributor and an exterior wall of the electrode.

17. The plasma arc torch according to claim 15, wherein the flow metering device is a plug disposed within the plasma gas passageway, the plug defining a metering passageway smaller in size than the plasma gas passageway.

18. The plasma arc torch according to claim 15 further comprising a plurality of flow metering devices disposed within a respective plurality of plasma gas passageways.

19. A gas distributor for use in a plasma arc torch comprising:

a body defining a proximal end portion and a distal end portion;

at least one plasma gas passageway formed in the proximal end portion; and at least one helical gas passageway formed along an interior portion of the body and in fluid communication with the plasma gas passageway, the helical gas passageway defining at least one groove having a smaller size towards the proximal end portion and a larger size towards the distal end portion.

20. A gas distributor for use in a plasma arc torch comprising:

a non-conductive body configured to be disposed between an electrode and a tip of the plasma arc torch; and at least one helical gas passageway formed along an interior portion of the non-conductive body, the helical gas passageway defining at least one groove.

21. A method of operating a plasma arc torch, the method comprising the steps of:

directing a flow of plasma gas through at least one plasma gas passageway;

successively directing the flow of plasma gas through at least one metering passageway such that a flow rate of the plasma gas is reduced; and successively directing the reduced flow rate plasma gas through a helical gas passageway within a gas distributor.

22. The method according to claim 21 further comprising the step of varying the size and number of plasma gas passageways, metering passageways, and helical gas passageways as a function of current level.

* * * * *